United States Patent
Liao

(10) Patent No.: US 7,988,319 B2
(45) Date of Patent: Aug. 2, 2011

(54) INERTIAL-POWER LIGHT-EMITTING DEVICE

(75) Inventor: Wen-Sen Liao, Pingjhen (TW)

(73) Assignee: Lightup Technology Co., Ltd., Pingjhen ( * ) Notice: Subject to any disclaimer, the term of this patent is extended or adjusted under 35 U.S.C. 154(b) by 352 days.

(21) Appl. No.: 12/241,700

(22) Filed: Sep. 30, 2008

(65) Prior Publication Data

US 2009/0251075 A1    Oct. 8, 2009

(30) Foreign Application Priority Data

Apr. 2, 2008  (TW) .............................. 97205670 U

(51) Int. Cl.
*B60Q 1/00* (2006.01)

(52) U.S. Cl. ........ 362/192; 362/183; 362/473; 362/501; 310/83

(58) Field of Classification Search .................. 362/501, 362/183, 192, 473; 310/78, 83, 41; 290/1 R
See application file for complete search history.

(56) References Cited

U.S. PATENT DOCUMENTS

| | | | | |
|---|---|---|---|---|
| 6,832,847 B2 * | 12/2004 | Frosythe et al. | ............... | 362/473 |
| 6,982,561 B2 * | 1/2006 | Scott | .............................. | 324/638 |
| 7,605,500 B2 * | 10/2009 | Liao et al. | ............... | 310/40 MM |
| 2002/0136021 A1 * | 9/2002 | Hung | .............................. | 362/500 |
| 2004/0042206 A1 * | 3/2004 | Luo | .............................. | 362/192 |
| 2006/0232988 A1 * | 10/2006 | Wang et al. | ................... | 362/475 |

* cited by examiner

*Primary Examiner* — Ali Alavi
(74) *Attorney, Agent, or Firm* — Workman Nydegger

(57) ABSTRACT

A light-emitting device driven by an inertial power includes an inertial module, a magnetic element, a magnetic-conductive element, at least one wire, and a light-emitting module. Under an inertial effect, the inertial module drives the magnetic element to rotate, such that a magnetic field generated by the magnetic-conductive element changes due to the rotation of the magnetic element. Moreover, the wire wound around the magnetic-conductive element generates a drive current in response to the changing of the magnetic field, so as to drive the light-emitting module to emit a light. As such, the magnetic field is changed under an inertial power, so as to generate a drive current for driving the light-emitting module, thereby achieving, a renewable energy source, environmental protection, and power-saving purposes.

16 Claims, 9 Drawing Sheets

INERTIAL-POWER LIGHT-EMITTING DEVICE

CROSS-REFERENCE TO RELATED APPLICATIONS

This non-provisional application claims priority under 35 U.S.C. §119(a) on Patent Application No(s). 097205670 filed in Taiwan, R.O.C. on Apr. 2, 2008 the entire contents of which are hereby incorporated by reference.

BACKGROUND OF THE INVENTION

1. Field of the Invention

The present invention relates to a light-emitting module, and more particularly to an light-emitting device driven by an inertial power, in which a light-emitting module is driven by an inertial power.

2. Related Art

Due to global warming, severe air pollution, and increasing demands on energy sources, a clean, environmentally-friendly, and sustainable new energy source must be found in the field of renewable energy sources, so as to cater to people's urgent demands.

Green energy sources, such as water power, wind power, geothermal power, and solar power, are all desired energies converted from natural phenomena, which will not become exhausted after long-term usage or overuse. However, as the green energy sources are obtained from certain natural phenomena, the environment and geographic location where the green energy sources can be effectively utilized are somewhat restricted. For example, the hydroelectric power generation can only be operated at places near the sea or rivers, and solar power generation can only be effectively utilized at places with sufficient sunshine.

SUMMARY OF THE INVENTION

Accordingly, the present invention is a light-emitting device driven by an inertial power, which can replace batteries or external electric powers, and avoid the failure of light emission due to restrictions on the environment or geographic locations.

A light-emitting device driven by an inertial power provided in the present invention includes an electromagnetic module, an inertial module, and a light-emitting module.

The electromagnetic module includes a magnetic element, a magnetic-conductive element, and at least one wire. The wire is wound around the magnetic-conductive element.

Under an inertial effect, the inertial module drives the magnetic element to rotate. A magnetic field generated by the magnetic-conductive element changes due to the rotation of the magnetic element, and the wire generates a drive current in response to the changing of the magnetic field.

The light-emitting module is electrically connected to the wire, and emits a light from the drive current.

Furthermore, the inertial module includes a transmission component and a gravity bump. The transmission component is connected to the magnetic element, and the gravity bump is connected to the transmission component. Under an inertial effect, the gravity bump drives the transmission component to rotate the magnetic element. Therefore, the gravity bump can drive the transmission component under rotation inertia or movement inertia.

The magnetic-conductive element includes a magnetic-conductive frame and at least one reel. The magnetic-conductive frame has a notch, and the magnetic element is located in the notch. The reel is wrapped on the magnetic-conductive frame, and the wire is respectively wound around the reel.

The light-emitting module includes at least one circuit board and at least one light-emitting element. The circuit board comprises at least one circuit, and the circuit is electrically connected to the wire for receiving the drive current. The light-emitting element is attached to the circuit board, and electrically connected to the circuit, so as to emit a light being driven by the drive current. In addition, the drive current is transmitted to the light-emitting element through the circuit on the circuit board for driving the light-emitting element.

Therefore, a light guiding plate is disposed on the circuit board, for converting a part of the light into a plane light, and emitting the plane light from the other side surface of the light guiding plate opposite to the circuit board. Furthermore, the light guiding plate is transmissive at a position corresponding to the light-emitting element, so as to let the other part of the light pass through there.

In the light-emitting device driven by an inertial power of the present invention, the inertial module is actuated being influenced by an inertial power to rotate the magnetic element. When a magnetic field generated by the magnetic-conductive element changes due to the rotation of the magnetic element, the wire wound around the magnetic-conductive element generates a drive current in response to the changing of the magnetic field, so as to drive the light-emitting module to emit a light. Therefore, the present invention generates electric power through an inertial power, so as to achieve the environmental protection and power-saving purposes, thereby solving the problem that the green energy devices (for example, solar cells) are restricted by the environment and geographic location.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

The features and practice of the present invention will be illustrated in detail below with reference to the accompanying drawings.

Figure 1:
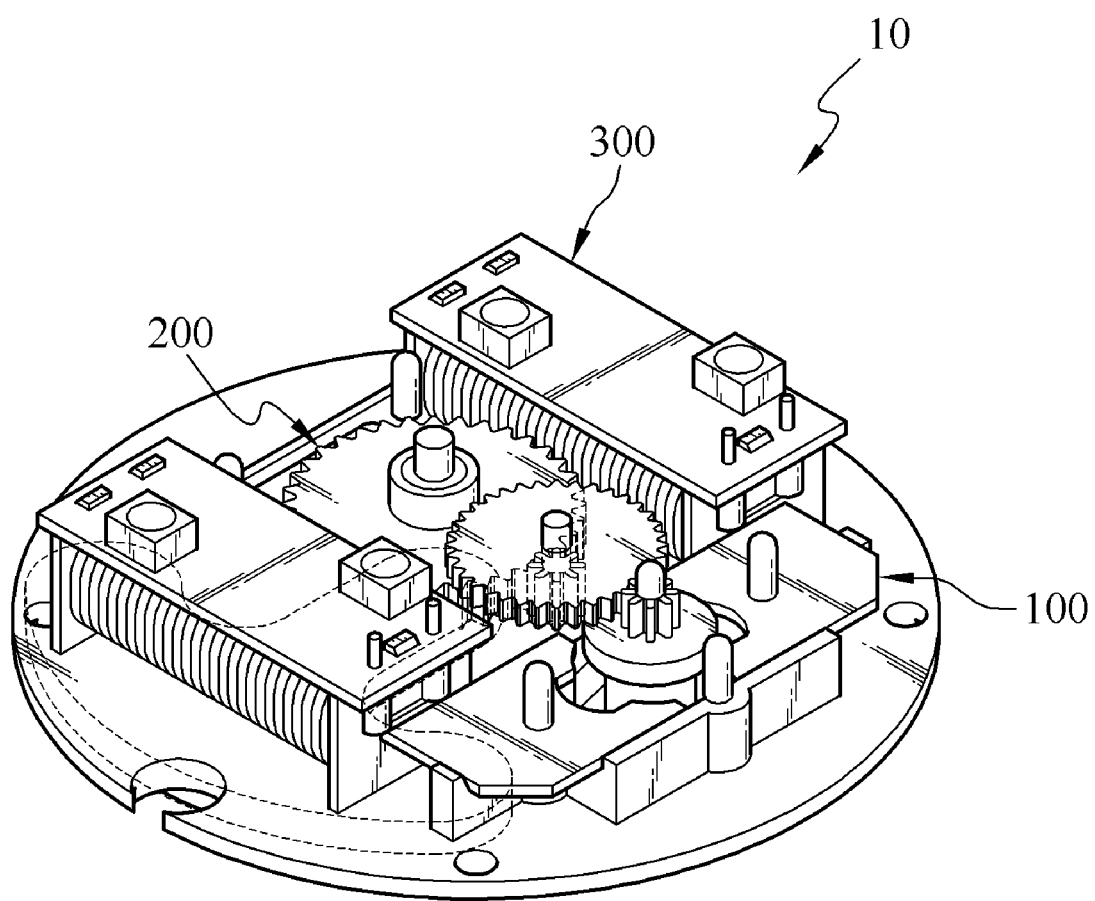
FIG. 1 is a schematic view of a light-emitting device driven by an inertial power according to a first embodiment of the present invention.

Referring to FIG. 1, it is a schematic view of a light-emitting device driven by an inertial power according to a first embodiment of the present invention. In this embodiment, the light-emitting device driven by an inertial power 10 includes an electromagnetic module 100, an inertial module 200, and a light-emitting module 300.

The light-emitting device driven by an inertial power 10 drives the electromagnetic module 100 to generate an alternatively-changed magnetic field due to the inertial power from the inertial module 200, and a drive current is generated in response to the changing of the magnetic field, so as to drive the light-emitting module 300 to emit a light.

Figure 2:
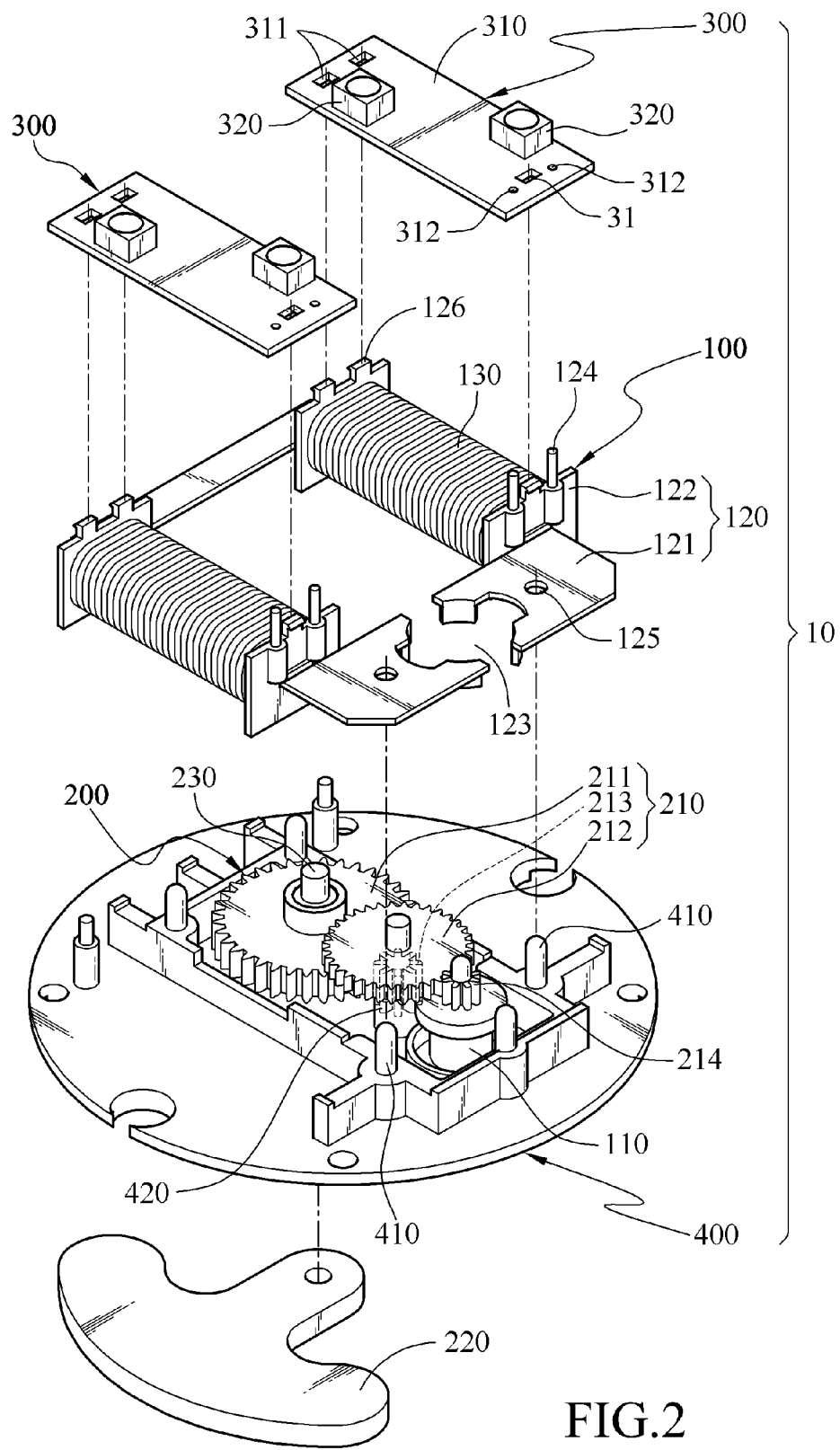
FIG. 2 is an exploded view of the light-emitting device driven by an inertial power according to the first embodiment of the present invention.

Next, referring to FIG. 2, it is an exploded view of the light-emitting device driven by an inertial power according to the first embodiment of the present invention.

The electromagnetic module 100 includes a magnetic element 110, a magnetic-conductive element 120, and at least one wire 130.

The magnetic element 110 is an element having two blocks of opposite magnetisms. The shape of the magnetic element 110 may be a geometric shape, such as spherical shape, cylindrical shape, or lumpy shape.

The wires 130 are wound around the magnetic-conductive element 120. The magnetic-conductive element 120 is made of a material easily magnetized, so as to be entirely magnetized in response to the magnetism of the magnetic element, and to generate a magnetic field there-around.

When the magnetic-conductive element 120 alternately responds to the two opposite magnetisms of the magnetic element, the magnetic field generated by the magnetic-conductive element 120 changes accordingly. At this time, the wires 130 wound around the magnetic-conductive element 120 generate a drive current in response to the changing of the magnetic field generated by the magnetic-conductive element 120.

In addition, the magnetic-conductive element 120 includes a magnetic-conductive frame 121 and at least one reel 122. The reels 122 are respectively wrapped on the magnetic-conductive frame 121, and the wires 130 are respectively wound around the reels 122.

The magnetic-conductive frame 121 may be a hollow frame, and a part of the components in the inertial module 200 may be disposed inside the magnetic-conductive frame 121 (i.e., the inner side of the hollow frame), so as to reduce the whole volume of the device.

The magnetic-conductive frame 121 has a notch 123, and the magnetic element 110 is disposed in the notch 123. The magnetic-conductive frame 121 is made of a material easily magnetized such as iron or iron-silicon alloy. The shape of the magnetic-conductive frame 121 may be a geometric shape, such as rectangular shape or circular shape.

Each reel 122 has a main body, and two conductive posts 124 are disposed on the main body. The wire 130 is respectively wound around the main body of the reel 122, and the two ends of the wire 130 are electrically connected to the two conductive posts 124 respectively. In order to be easily assembled, the two conductive posts 124 may be disposed on one end of the main body of the reel 122, or may also be respectively disposed on two ends or other positions of the main body of the reel 122 according to the actual requirements.

In response to the magnetism of the magnetic element 110, the magnetic-conductive frame 121 has itself magnetized to generate a magnetic field with a direction opposite to that of the magnetic field of the magnetic element 110. Therefore, when the magnetic element 110 is rotated, the magnetic-conductive frame 121 alternately responds to the two opposite magnetisms of the magnetic element 110, so that the magnetic field generated by the magnetic-conductive frame 121 changes alternately. Therefore, in response to the changing of the magnetic field, the wire 130 wound around the reel 122 wrapped on the magnetic-conductive frame 121 generates a drive current.

The inertial module 200 includes a transmission component 210 and a gravity bump 220.

The transmission component 210 is connected to the magnetic element 110. The gravity bump 220 is connected to the transmission component 210. When the gravity bump 220 rotates or moves under an inertial effect, it drives the transmission component 210 to rotate the magnetic element 110.

The gravity bump 220 may be directly connected to the magnetic element 110, so that when the gravity bump 220 rotates or moves under an inertial effect, it directly drives the magnetic element 110 to rotate.

The transmission component 210 may be a gear set. Moreover, the gear set may be a single gear or a plurality of gears engaged with each other in pairs.

Figure 3:
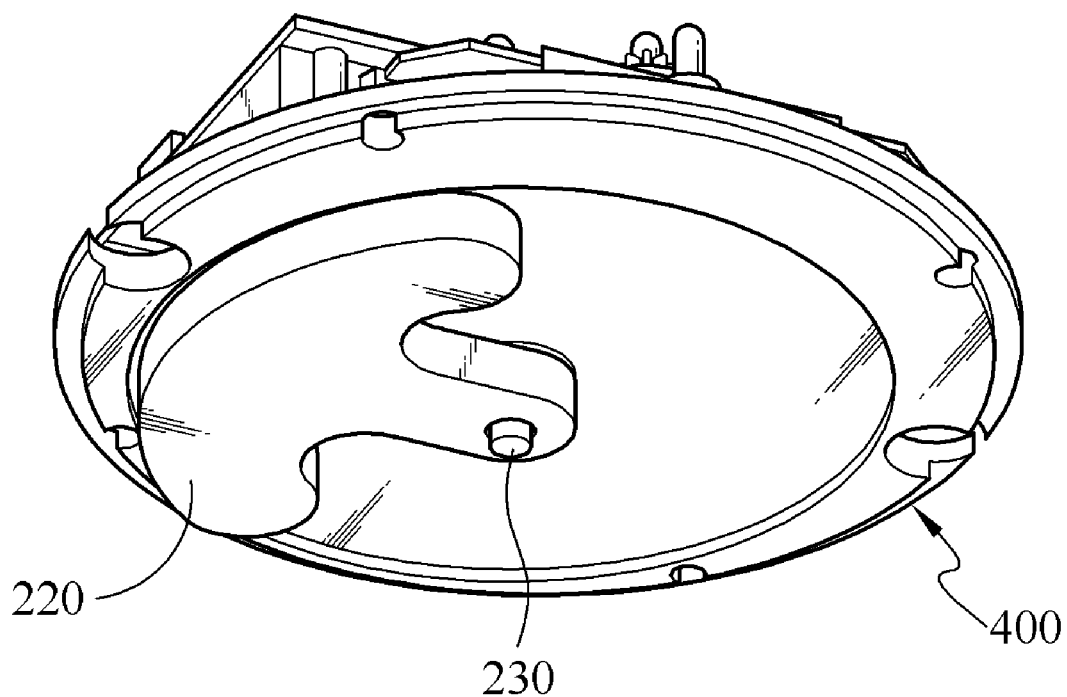
FIG. 3 is a schematic view of an inertial module according to the first embodiment of the present invention.

In this embodiment, the gravity bump 220 is a swinging member (as shown in FIG. 3), and the transmission component 210 includes a first gear 211, a second gear 212, a third gear 213, and a first support shaft 230.

One end of the first support shaft 230 penetrates the center of the first gear 211, and the other end penetrates the gravity bump 220, so that the first gear 211 and the gravity bump 220 are fixed on the first support shaft 230, thereby the first gear 211 and the gravity bump 220 are coaxially connected. When the gravity bump 220 is rotated, it drives the first gear 211 to rotate accordingly through the first support shaft 230.

The first gear 211 and the second gear 212 are engaged with each other to form a driving relationship through engagement. The second gear 212 is coaxially connected to the third gear 213. The third gear 213 is engaged with a fourth gear 214 coaxially-connected to the magnetic element 110, so as to form a driving relationship through engagement. In addition, the fourth gear 214 and the magnetic element 110 may be integrally formed. That is, the magnetic element 110 has a gear structure disposed thereon.

When the first gear 211 is rotated and being driven by the gravity bump 220, the second gear 212 is driven to rotate accordingly due to the engagement relation. Meanwhile, as the second gear 212 and the third gear 213 are coaxially connected, the third gear 213 is rotated together with the second gear 212 and also drives the fourth gear 214 to rotate accordingly due to the engagement there-between. As the fourth gear 214 and the magnetic element 110 are coaxially connected, the magnetic element 110 is rotated together with the fourth gear 214.

The light-emitting module 300 includes at least one circuit board 310 and at least one light-emitting element 320.

The circuit board 310 is disposed with a circuit (not shown). The circuit, electrically connected to the conductive posts 124, receives the drive current output by the wire 130 through the conductive posts 124.

Each light-emitting element 320 is disposed on the circuit board 310 and electrically connected to the circuit of the circuit board 310. The light-emitting element 320 receives the drive current through the circuit of the circuit board 310, and emits a light being driven by the drive current.

When a plurality of light-emitting elements 320 is disposed, the light-emitting elements 320 may be connected in series, in parallel, or in both series and parallel.

As the light-emitting device driven by an inertial power 10 is moved or rotated, the first support shaft 230 may not be located at the center point of the light-emitting device driven by an inertial power 10, so that the gravity bump 220 rotates or moves under an inertial effect, and drives the first gear 211 connected to the first support shaft 230 to rotate accordingly. Furthermore, due to the engagement relations between the gears, the magnetic element 110 is driven to rotate. When the magnetic field generated by the magnetic-conductive element 120 changes in response to the rotation of the magnetic element 110, the wires wound around the magnetic-conductive element 120 generate a drive current in response to the changing of the magnetic field, in which the drive current is an AC current. When the light-emitting elements 320 are serially connected, the light-emitting elements 320 are simultaneously turned on or off with the changing of the AC. When the light-emitting elements 320 are connected in parallel, the light-emitting elements 320 are partially turned on and partially turned off with the changing of the AC.

Moreover, a base plate 400 is provided for the electromagnetic module 100, the inertial module 200, and the light-emitting module 300 to be disposed thereon. In this embodiment, the magnetic element 110, the transmission component 210, and the gravity bump 220 are movably disposed on the base plate 400, and the magnetic-conductive element 120 is fixed on the base plate 400.

The base plate 400 has at least one pillar 410 and at least one bearing 420 formed thereon. The pillars 410 pass through holes 125 in the magnetic-conductive frame 121, so as to fix the magnetic-conductive frame 121 on the base plate 400. The bearings 420 are provided for the first gear 211, the second gear 212, and the magnetic element 110 to penetrate through, and the first gear 211, the second gear 212, and the magnetic element 110 may respectively rotate with respect to the bearings 420. In other words, the number of the bearings on the base plate is determined by the number of the gears needed.

In terms of the assembling process, the circuit board 310 has buckling holes 311 and holes 312 disposed thereon. The buckling holes 311 are corresponding to hooks 126 disposed on the main body of the reel 122, and the holes 312 are corresponding to the conductive posts 124 disposed on the main body of the reel 122. In other words, the circuit board 310 may be overlapped and fixed on the reel 122 through the engagement between the hooks 126 of the reel 122 and the buckling holes 311. Moreover, the conductive posts 124 of the reel 122 penetrate through the holes 312 and are electrically connected to the circuit of the circuit board 310. Furthermore, the circuit of the circuit board 310 may extend to the holes 312. When the circuit board 310 is fixed to the reel 122, the conductive posts 124 are clipped in the holes 312 or welded in the holes 312, so that the conductive posts 124 are electrically connected to the circuit of the circuit board 310. Thus, the drive current flows to the circuit of the circuit board 310 through the conductive posts 124 and drives the light-emitting elements 320 electrically-connected to the circuit of the circuit board 310 through the circuit.

In the light-emitting device driven by an inertial power 10 of the present invention, as the first support shaft 230 is not located at the center point of the base plate 400, through an external power, the gravity bump 220 rotates under an inertial effect and drives the first gear 211 connected to the first support shaft 230 to rotate. Furthermore, the magnetic element 110 is also driven to rotate due to being engaged with the gears (for example, the second gear 212, the third gear 213, and the fourth gear 214). When the magnetic field generated by the magnetic-conductive element 120 changes in response to the rotation of the magnetic element 110, the wire 130 wound around the magnetic-conductive element 120 generates a drive current in response to the changing of the magnetic field, so as to drive the light-emitting elements 320 on the circuit board 310 to emit a light. Therefore, the magnetic field changes due to an inertial power and thus a drive current is induced and generated to drive the light-emitting modules. The result achieves environmental protection and power-saving purposes, and to solves the problem that the green energy devices face (for example, solar cells) when restricted by the environment and geographic location.

Figure 4:
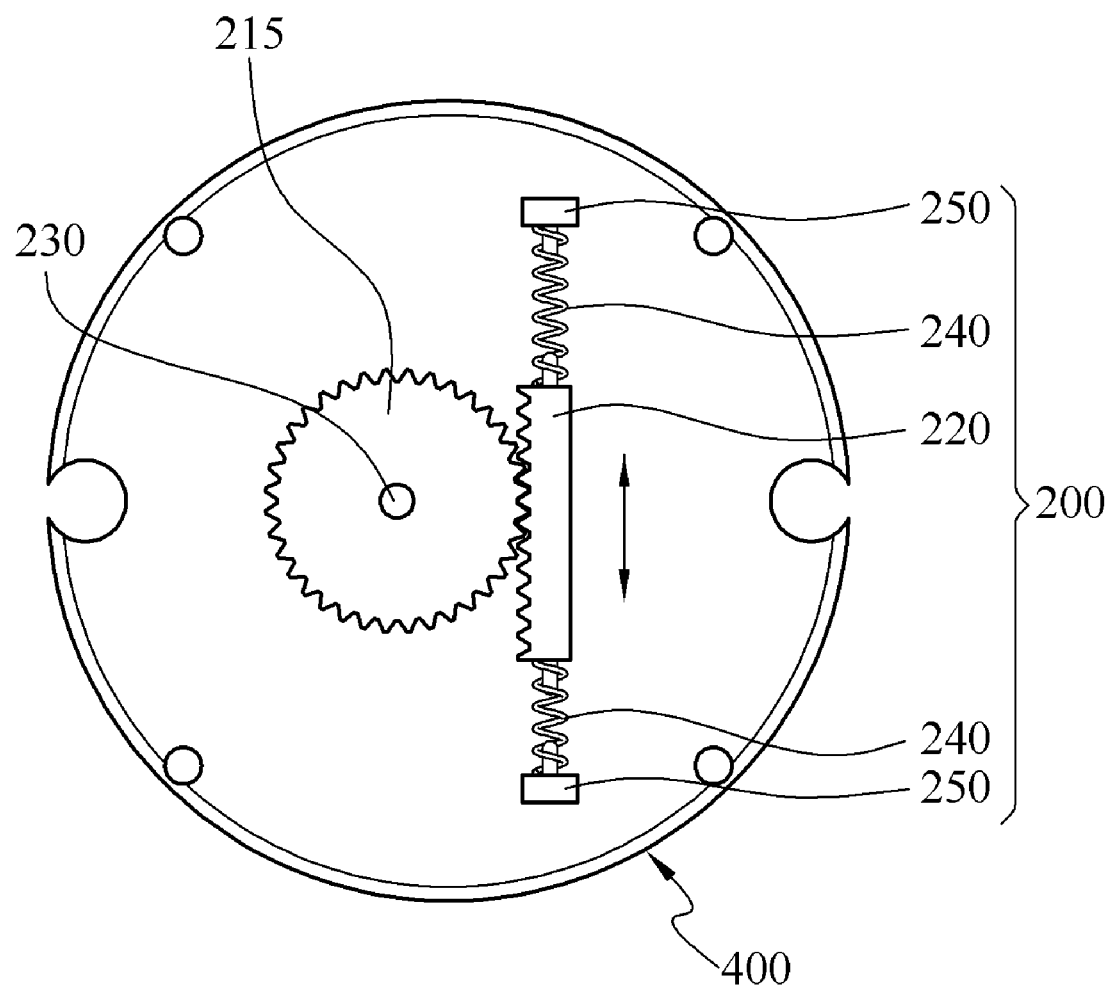
FIG. 4 is a schematic view of an inertial module according to a second embodiment of the present invention.

Referring to FIG. 4, it is a schematic view of an inertial module according to a second embodiment of the present invention. In this embodiment, the inertial module 200 includes a transmission component 210 (referring to FIG. 2), a gravity bump 220, and at least one elastic element 240. Here, the gravity bump 220 is a moving member.

The transmission component 210 further includes a fifth gear 215. The first support shaft 230 passes through the base plate 400, with one end penetrating and fixed to the center of the first gear 211 and the other end penetrating and fixed to the center of the fifth gear 215, so that the fifth gear 215 is coaxially connected to the first gear 211. However, according to actual design requirements, the two ends of the first support shaft 230 may be respectively fixed to the center of the fifth gear 215 and the axle center of the magnetic element 110. Alternatively, a gear structure mounted on the magnetic element 110 directly serves as the fifth gear 215, i.e., the fifth gear 215 and the magnetic element 110 are integrally formed.

The elastic element 240 is connected to the gravity bump 220. When the gravity bump 220 is moved under an inertial effect, the gravity bump 220 may move back and forth repeatedly under an elastic force of the elastic element 240.

Moreover, the gravity bump 220 has a tooth-shaped structure thereon, so as to be engaged with the fifth gear 215, and thus the gravity bump 220 forms a driving relationship through engagement with the fifth gear 215. Therefore, when the gravity bump 220 operates repeatedly (i.e., moves back and forth repeatedly), it drives the fifth gear 215 to rotate through the engagement. As a result, the first support shaft 230 fixed on the fifth gear 215 is driven to rotate, and the first gear 211 is rotated together with the first support shaft 230.

In addition, the tooth-shaped structure on the gravity bump 220 extends in a direction where the gravity bump 220 operates repeatedly.

One end of the elastic element 240 is fixed to the gravity bump 220, and the other end is fixed to the fixing member 250. Moreover, the fixing member 250 is fixed on the base plate 400. Furthermore, the fixing member 250 may also be a protruding structure integrally formed on the base plate 400.

Figure 5A:
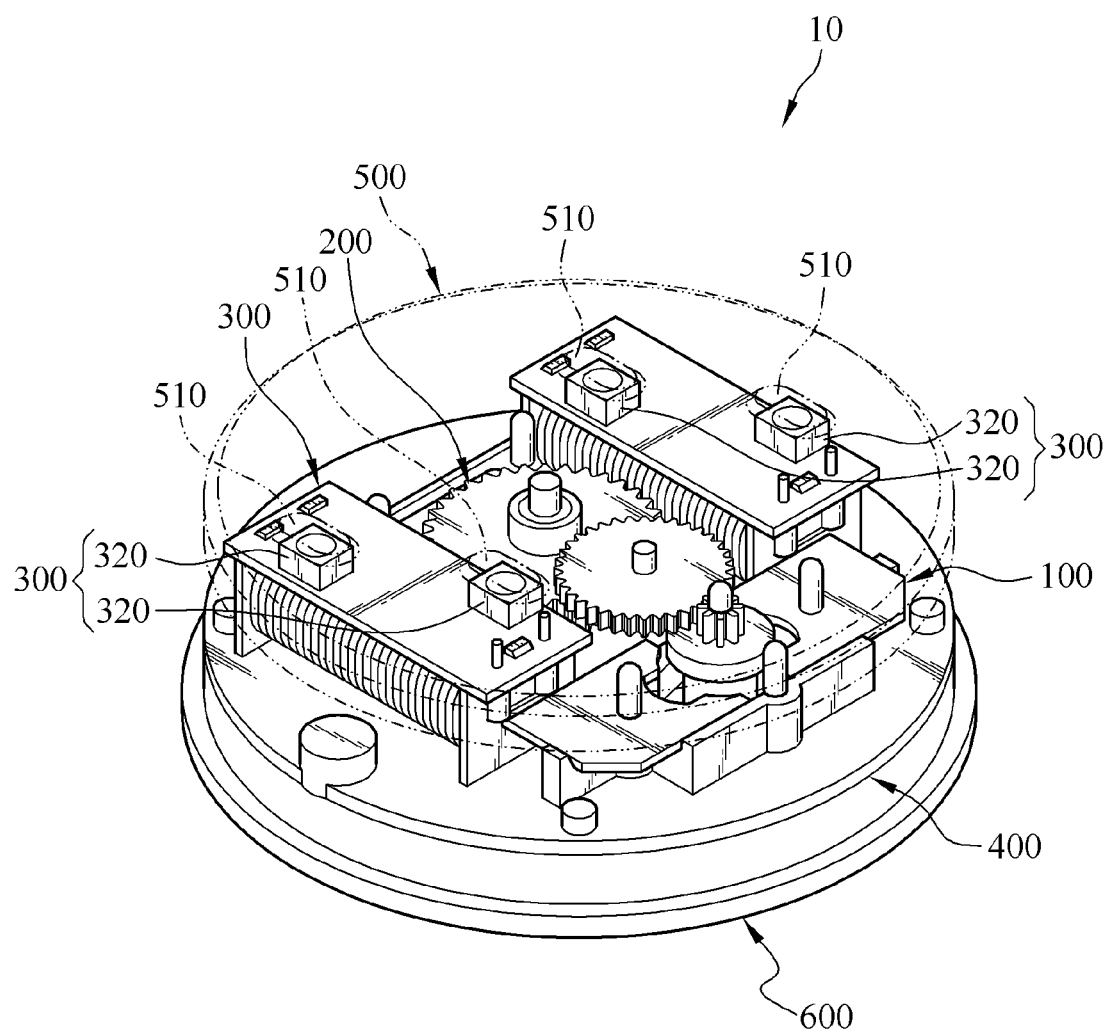
FIG. 5A is a schematic view of a light-emitting device driven by an inertial power according to the second embodiment of the present invention.
Figure 5B:
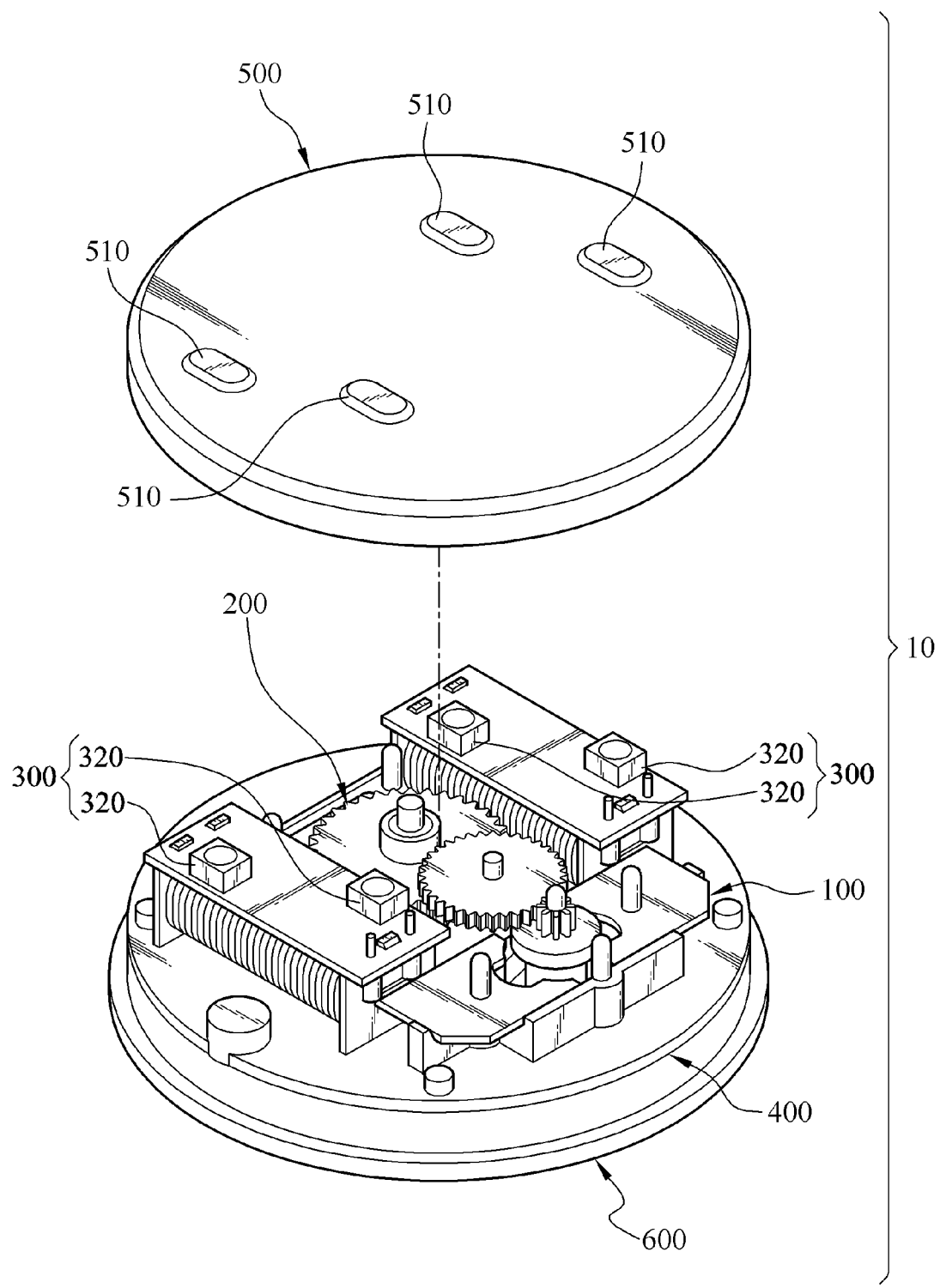
FIG. 5B is an exploded view of the light-emitting device driven by an inertial power according to the second embodiment of the present invention.

Referring to FIGS. 5A and 5B, FIG. 5A is a schematic view of a light-emitting device driven by an inertial power according to the second embodiment of the present invention, and FIG. 5B is an exploded view of the light-emitting device driven by an inertial power according to the second embodiment of the present invention. The structure design of this embodiment is substantially applicable to the above embodiment. In this embodiment, the light-emitting device driven by an inertial power 10 further includes a light guiding plate 500.

The light guiding plate 500 is disposed on the light-emitting module 300. When the light-emitting module 300 emits a light, the light is incident from one side surface of the light guiding plate 500 facing the light-emitting module 300. Then, the incident light forms a total reflection transmission within the light guiding plate 500 due to the refractive index difference between the light guiding plate 500 and the air, so as to be converted into a plane light. After that, the plane light is emitted from the other side surface of the light guiding plate 500 opposite to the light-emitting module 300.

Furthermore, a required pattern structure (not shown) may be formed within the light guiding plate 500 by means of printing or mould opening. The pattern structure may disturb the total reflection transmission of the light within the light guiding plate 500, and as a result, the plane light is emitted from the other side surface of the light guiding plate 500 opposite to the light-emitting module 300.

In addition, the light guiding plate 500 has at least one transmissive portion 510 corresponding to the positions of the light-emitting elements 320 in the light-emitting module 300, such that the light guiding plate 500 is transmissive at positions corresponding to the light-emitting elements 320. Therefore, a part of the incident light directly penetrates the light guiding plate 500 through the transmissive portions 510, and the other part of the incident light is incident into the light guiding plate 500 and then converted into a plane light through total reflection transmission. Here, the transmissive portions 510 may be through holes, which are filled with a transmissive material, or have transmissive masks disposed at the entrance thereof. Furthermore, a light-reflective material (for example, a metal such as Ag or Al) is coated/provided on the surface of the light guiding plate 500 except the transmissive portions 510. Therefore, the light-emitting device driven by an inertial power 10 has a reflective effect when an external light is irradiated thereon.

Furthermore, a seat 600 may be disposed on the light-emitting device driven by an inertial power of the present invention depending the actual requirements.

The seat 600 is fixedly joined to the base plate 400, and the other side surface of the base plate 400 opposite to the light-emitting module 300 faces the inner surface of the seat 600 (i.e., the other surface of the seat opposite to the external side of the housing). A combining structure may be designed on the outer surface of the seat 600, so as to assemble the light-emitting device driven by an inertial power to other objects.

In addition, the seat 600 accommodates the electromagnetic module 100, the inertial module 200, the light-emitting module 300, and the base plate 400, and is further connected to the light guiding plate 500, so as to protect the inner structure from being exposed.

Figure 6:
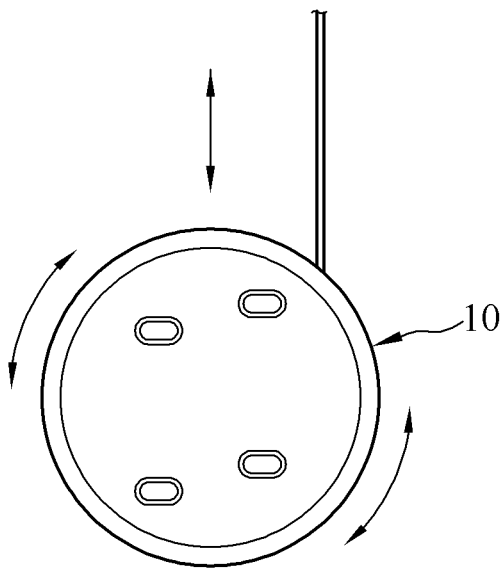
FIG. 6 is a schematic view of a first application of a light-emitting device driven by an inertial power according to the present invention.

Referring to FIG. 6, it is a schematic view of a first application of a light-emitting device driven by an inertial power according to the present invention. The light-emitting device driven by an inertial power of the present invention is applicable to the design of a yo-yo. Here, the light-emitting device driven by an inertial power 10 according to an embodiment of the present invention may be mounted on two side surfaces of the yo-yo or made into two side surfaces of the yo-yo. When the yo-yo rotates, the gravity bump inside the light-emitting device driven by an inertial power 10 rotates or moves back and forth under an inertial effect, such that a drive current is generated to drive the light-emitting module to emit a light.

Figure 7:
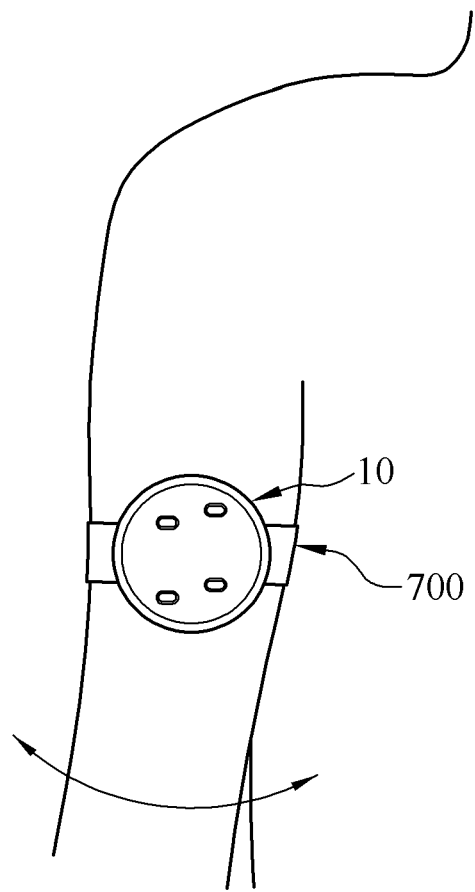
FIG. 7 is a schematic view of a second application of the light-emitting device driven by an inertial power according to the present invention.

Referring to FIG. 7, it is a schematic view of a second application of the light-emitting device driven by an inertial power according to the present invention. The light-emitting device driven by an inertial power of the present invention is applicable to sports. Here, a combining structure such as a rope belt 700 is designed on the light-emitting device driven by an inertial power 10. For example, through the rope belt 700, the light-emitting device driven by an inertial power 10 is bound to a person's arm. Thus, when doing exercises, the person makes gestures thorough the arm, the gravity bump within the light-emitting device driven by an inertial power 10 rotates or moves back and forth under an inertial effect, so that a drive current is generated to drive the light-emitting module to emit a light. Meanwhile, when the person does exercises at night, the light-emitting device driven by an inertial power of the present invention can also achieve warning and lighting functions.

Figure 8:
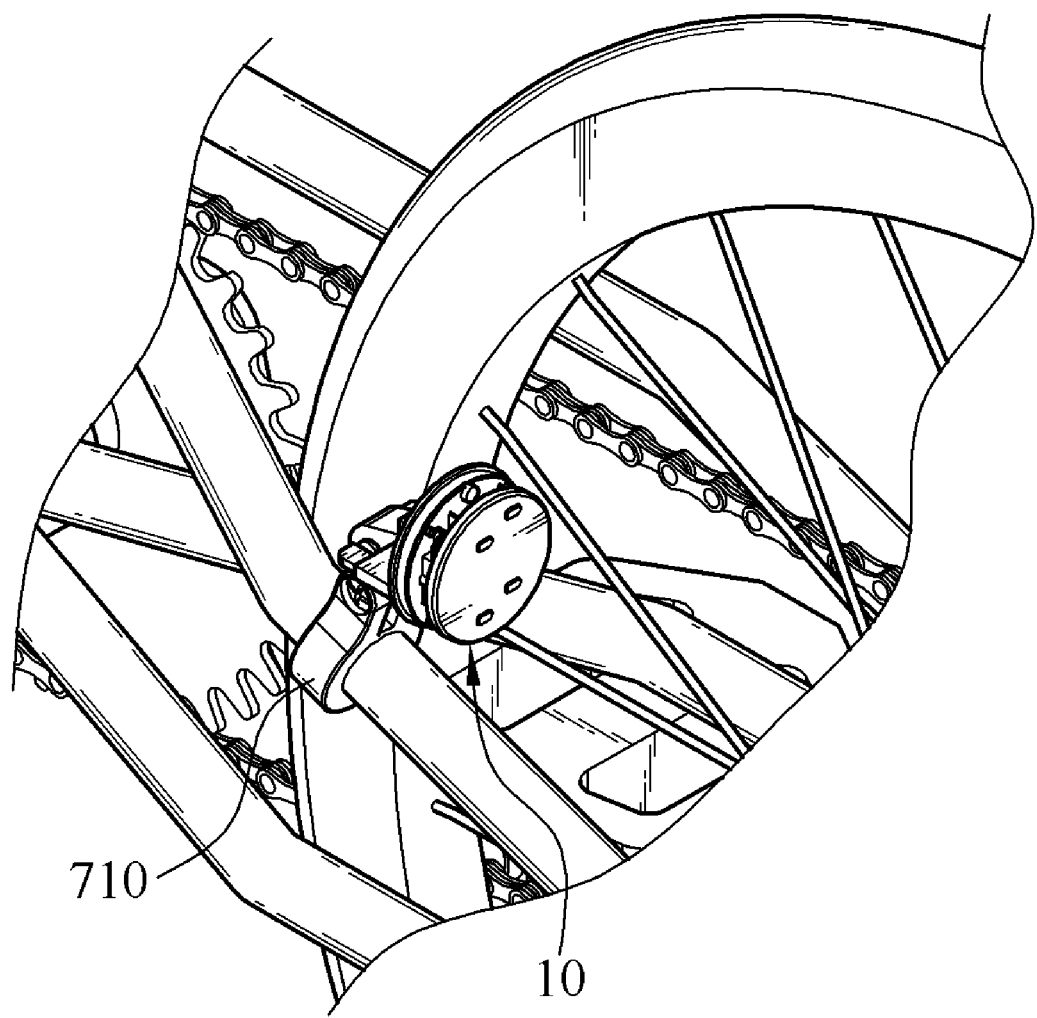
FIG. 8 is a schematic view of a third application of the light-emitting device driven by an inertial power according to the present invention.

Referring to FIG. 8, it is a schematic view of a third application of the light-emitting device driven by an inertial power according to the present invention. Here, a combining structure such as a securing device 710 is designed on the light-emitting device driven by an inertial power 10. For example, through the securing device 710, the light-emitting device driven by an inertial power 10 is fixed onto a vehicle as a decoration, such as a bicycle or motor; or further serves as a warning lamp and/or illuminating lamp. That is, when the vehicle moves, the gravity bump within the light-emitting device driven by an inertial power 10 swings or moves back and forth under an inertial effect, so that a drive current is generated to drive the light-emitting module to emit a light. Therefore, when the vehicle is used for traveling at night, the light-emitting device driven by an inertial power of present invention can achieve warning and lighting functions.

Figure 9:
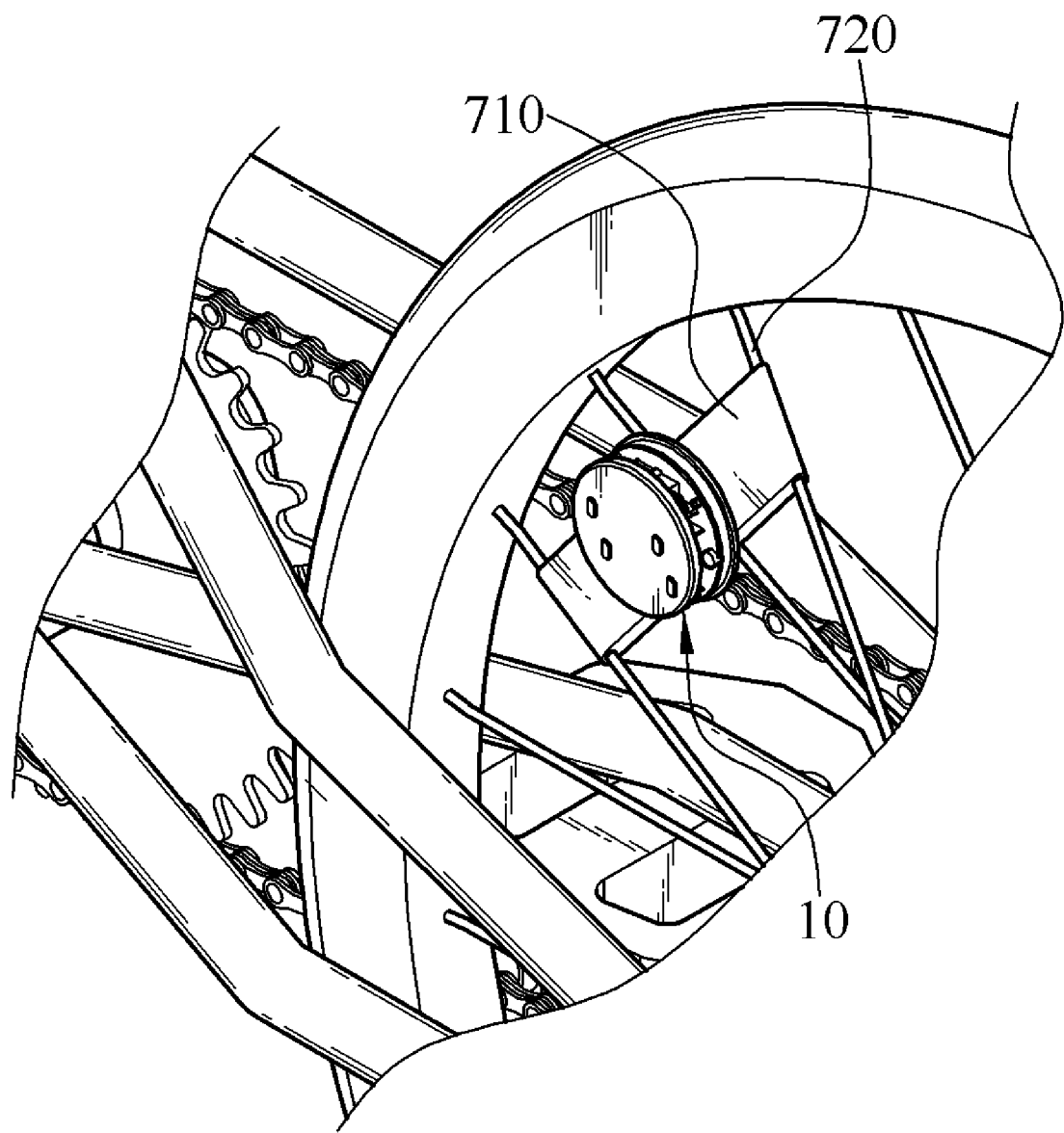
FIG. 9 is a schematic view of a fourth application of the light-emitting device driven by an inertial power according to the present invention.

Referring to FIG. 9, it is a schematic view of a fourth application of the light-emitting device driven by an inertial power according to the present invention. In this application, through the securing device 710, the light-emitting device driven by an inertial power 10 is fixed on spokes 720 of a cycle wheel in a bicycle. When a person rides the bicycle, the cycle wheels are rotated, and the gravity bump within the light-emitting device driven by an inertial power 10 swings or moves back and forth under an inertial effect, so that a drive current is generated to drive the light-emitting module to emit a light. Therefore, the present invention may not only be used for decoration, but also function as a warning lamp and/or illuminating lamp.

In addition, when a light-reflective material is coated/provided on the light-emitting device driven by an inertial power 10, the light-emitting device driven by an inertial power 10 not only drives the light-emitting element to emit a light being influenced by an inertial effect, but also reflects the external lights to achieving a warning effect, no matter if the bicycle is in movement or stands still.

What is claimed is:

1. A light-emitting device driven by an inertial power, comprising:
    an electromagnetic module, comprising:
        a magnetic element;
        a magnetic-conductive element, for generating a magnetic field in response to the magnetic element; and
        at least one wire, wound around the magnetic-conductive element;
    an inertial module comprising:
        a gear set, connected to the magnetic element, and the gear set has a plurality of gears engaged with each other in pairs; and
        a gravity bump, connected to the gear set, for driving the gear set to rotate the magnetic element under an inertial effect, wherein the magnetic field generated by the magnetic-conductive element changes due to the rotation of the magnetic element, and the wire generates a drive current in response to the changing of the magnetic field; and
    a light-emitting module, electrically connected to the wire, for emitting a light being driven by the drive current.

2. The light-emitting device driven by an inertial power according to claim 1, further comprising:
a light guiding plate, located on the light-emitting module, for converting the light incident on a side surface of the light guiding plate facing the light-emitting module into a plane light, and emitting the plane light from the other side surface of the light guiding plate opposite to the light-emitting module.

3. The light-emitting device driven by an inertial power according to claim 2, wherein the light guiding plate is transmissive at a position corresponding to the light-emitting element, such that a part of the light passes through the light guiding plate, and the other part of the light is converted into a plane light for being emitted from the other surface of the light guiding plate opposite to the light-emitting module.

4. The light-emitting device driven by an inertial power according to claim 1, wherein the gravity bump is a swinging member coaxially connected to the gear set, and the swinging member is used for rotating under an inertial effect and driving the gear set to rotate the magnetic element.

5. The light-emitting device driven by an inertial power according to claim 1, wherein the gravity bump comprises:
a third gear, coaxially connected to the gear set;
a moving member, having an engagement structure matching with the third gear, so as to be engaged with the third gear; and
at least one elastic element, connected to the moving member, wherein being influenced by an inertial effect, the elastic element forces the moving member to move back and forth under an elastic force, and drives the third gear to rotate, so as to actuate the gear set to rotate the magnetic element.

6. The light-emitting device driven by an inertial power according to claim 1, wherein the magnetic-conductive element comprises:
a magnetic-conductive frame, for generating the magnetic field in response to the magnetic element; and
at least one reel, wrapped on the magnetic-conductive frame with the wire wound thereon.

7. The light-emitting device driven by an inertial power according to claim 1, wherein the light-emitting module comprises:
at least one circuit board, disposed with at least one circuit, wherein the circuit is connected to the wire for receiving the drive current; and
at least one light-emitting element, disposed on the circuit board, and electrically connected to the circuit, so as to emit the light being driven by the drive current.

8. A light-emitting device driven by an inertial power, comprising:
an electromagnetic module, comprising:
a magnetic element;
a magnetic-conductive element, for generating a magnetic field in response to the magnetic element; and
at least one wire, wound around the magnetic-conductive element;
an inertial module, connected to the magnetic element, for driving the magnetic element to rotate under an inertial effect, wherein the magnetic field generated by the magnetic-conductive element changes due to the rotation of the magnetic element, and the wire generates a drive current in response to the changing of the magnetic field;
a light-emitting module, electrically connected to the wire, for emitting a light being driven by the drive current; and
a light guiding plate, located on the light-emitting module, for converting the light incident on a side surface of the light guiding plate facing the light-emitting module into a plane light, and emitting the plane light from the other side surface of the light guiding plate opposite to the light-emitting module.

9. The light-emitting device driven by an inertial power according to claim 8, wherein the inertial module comprises:
a transmission component, connected to the magnetic element; and
a gravity bump, connected to the transmission component, for driving the transmission component to rotate the magnetic element under an inertial effect.

10. The light-emitting device driven by an inertial power according to claim 9, wherein the transmission component is a gear set, and the gear set has a plurality of gears engaged with each other in pairs.

11. The light-emitting device driven by an inertial power according to claim 8, wherein the gravity bump is a swinging member coaxially connected to the gear set, and the swinging member is used for rotating under an inertial effect and driving the gear set to rotate the magnetic element.

12. The light-emitting device driven by an inertial power according to claim 8, wherein the gravity bump comprises:
a third gear, coaxially connected to the gear set;
a moving member, having an engagement structure matching with the third gear, so as to be engaged with the third gear; and
at least one elastic element, connected to the moving member, wherein being influenced by an inertial effect, the elastic element forces the moving member to move back and forth under an elastic force, and drives the third gear to rotate, so as to actuate the gear set to rotate the magnetic element.

13. The light-emitting device driven by an inertial power according to claim 8, wherein the magnetic-conductive element comprises:
a magnetic-conductive frame, for generating the magnetic field in response to the magnetic element; and
at least one reel, wrapped on the magnetic-conductive frame with the wire wound thereon.

14. The light-emitting device driven by an inertial power according to claim 8, wherein the light-emitting module comprises:
at least one circuit board, disposed with at least one circuit, wherein the circuit is connected to the wire for receiving the drive current; and
at least one light-emitting element, disposed on the circuit board, and electrically connected to the circuit, so as to emit the light being driven by the drive current.

15. The light-emitting device driven by an inertial power according to claim 8, wherein the light guiding plate is transmissive at a position corresponding to the light-emitting element, such that a part of the light passes through the light guiding plate, and the other part of the light is converted into a plane light for being emitted from the other surface of the light guiding plate opposite to the light-emitting module.

16. An light-emitting device driven by an inertial power, comprising:
an electromagnetic module, comprising:
a magnetic-conductive frame, having a notch;
a magnetic element, located in the notch;
at least one reel, wrapped on the magnetic-conductive frame; and
at least one wire, respectively winded around the reel;
wherein when the magnetic element is rotated, a magnetic field generated by the magnetic-conductive frame changes due to the rotation of the magnetic element, and the wire generates a drive current in response to the changing of the magnetic field;

an inertial module, comprising:
  a gravity bump; and
  a gear set, connected to the gravity bump and the magnetic element;
  wherein when the light-emitting device driven by an inertial power moves, the gravity bump moves under an inertial effect and actuates the gear set to rotate the magnetic element; and
a light-emitting module, comprising:
  at least one circuit board, disposed with at least one circuit, wherein the circuit is electrically connected to the wire for receiving the drive current; and
  at least one light-emitting element, disposed on the circuit board, and electrically connected to the circuit, so as to emit a light being driven by the drive current; and
  a light guiding plate, located on the circuit board, and being transmissive at a position corresponding to the light-emitting element, such that a part of the light passes through the light guiding plate, and the other part of the light is converted into a plane light, and the plane light is emitted from the other surface of the light guiding plate opposite to the light-emitting module.

* * * * *